Figure 1:
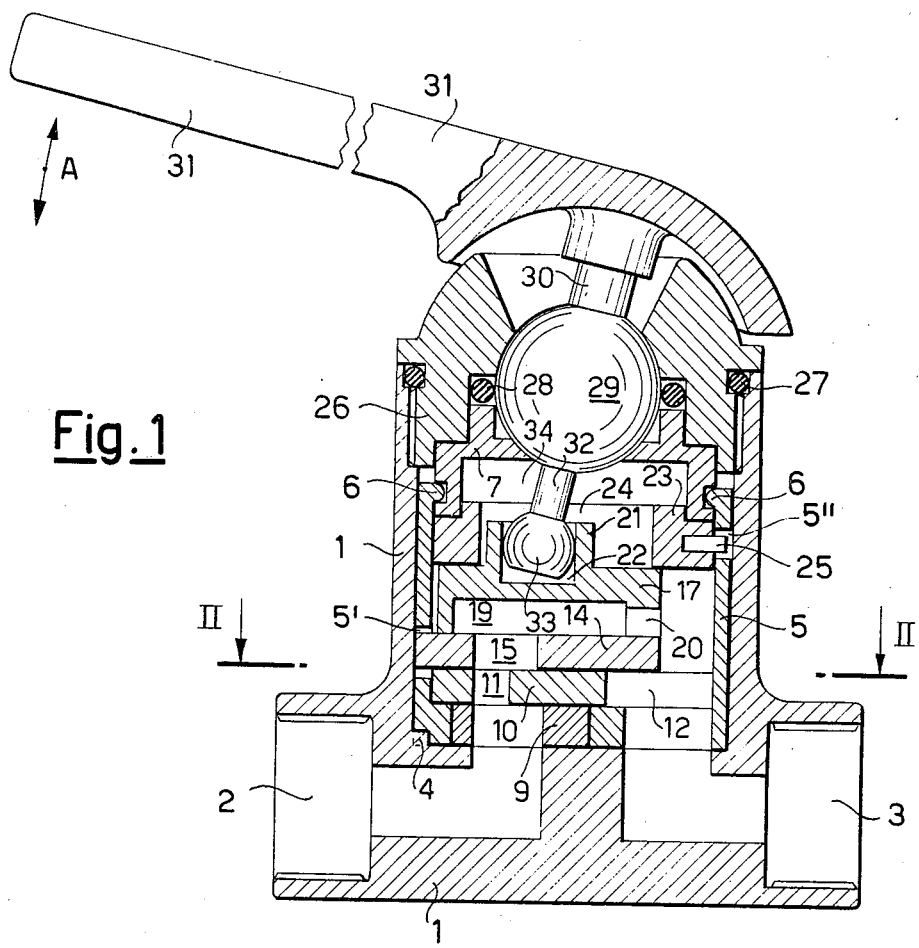

United States Patent [19]

Uhlmann

[11] 4,325,403
[45] Apr. 20, 1982

[54] SINGLE-CONTROL MIXING COCK WITH PLATES MADE OF HARD MATERIAL

[75] Inventor: Joachim Uhlmann, Leonberg, Fed. Rep. of Germany

[73] Assignee: Gevipi A.G., Triesen, Liechtenstein

[21] Appl. No.: 145,236

[22] Filed: Apr. 30, 1980

[30] Foreign Application Priority Data

May 4, 1979 [IT] Italy .............................. 44806 A/79
May 4, 1979 [IT] Italy .............................. 44807 A/79

[51] Int. Cl.³ .......................................... F16K 43/00
[52] U.S. Cl. .................................. 137/315; 137/454.6; 137/454.5; 137/625.17; 137/636.2; 137/636.3
[58] Field of Search .................. 137/315, 454.5, 454.6, 137/625.17, 636.3, 636.2

[56] References Cited

U.S. PATENT DOCUMENTS

| | | | |
|---|---|---|---|
| 3,384,119 | 5/1968 | Manoogian | 137/625.17 |
| 3,433,264 | 3/1969 | Parkison | 137/625.17 |
| 3,533,436 | 10/1970 | Parkison | 137/636.3 X |
| 3,536,101 | 10/1970 | Bosworth | 137/315 |
| 3,736,959 | 6/1973 | Parkison | 137/625.17 |
| 3,854,493 | 12/1974 | Farrell | 137/454.6 X |
| 3,882,897 | 5/1975 | Manoogian | 137/636.3 X |
| 3,893,842 | 7/1975 | Loose | 137/625.17 |
| 3,958,601 | 5/1976 | Schmitt | 137/636.2 |
| 3,965,936 | 6/1976 | Lyon | 137/625.17 |
| 4,175,586 | 11/1979 | Haymann | 137/454.6 X |

Primary Examiner—Harold W. Wealsley
Attorney, Agent, or Firm—Diller, Ramik & Wight

[57] ABSTRACT

In a single-control mixing cock the proportion of mixing between hot water and cold water and the delivery flow rate are controlled by plates (10,14) of hard material sliding one with respect to the other along plane surfaces and contained within a replaceable cartridge supported in oriented fashion within the body of the cock.

In order to avoid the necessity of replacing the articulated joints for the control lever of the cock, plates (10,14), control means (17), guide and motion-limiting means (23), are contained in the shell (5,6) of the cartridge, said control means (17) being provided with a coupling means (22) complementary and reciprocally engageable with coupling means (33) of the control lever (31) connected by the articulated joint (29) to a cap which retains the cartridge within the body of the cock.

26 Claims, 10 Drawing Figures

SINGLE-CONTROL MIXING COCK WITH PLATES MADE OF HARD MATERIAL

The present invention relates to a single-control mixer in which the regulation of the flow rate and the regulation of the proportion of mixing of hot and cold water are performed by plates made of hard material, which slide one with respect to the other along plane surfaces.

In cocks in which the different components are assembled in the body of the cock without forming a cartridge, any faulty component can be replaced singly as required without having to replace other components still in good working order; however, this operation is relatively difficult to perform and only an expert technician can do so correctly. In cartridge type cocks, on the other hand, the repair operation—which is performed by replacing the entire cartridge—can be quickly carried out by non-specialized persons; however, even if only one part of it or a few parts of it are faulty, the whole cartridge has to be replaced. More particularly, in the single-control cartridge-type mixing cocks thus far known, the cartridge comprises, in addition to the plates made of hard material and related seal means, control and guide means and means for limiting movement, also the articulated joints for the control lever. This is among other things due to the fact that in the said cartridge-type cocks the lever articulated joints do not consist only of a ball, but take part in the transmission of the control movements. One consequence of this arrangement is that if the cartridge is replaced the articulated joints for the lever also have to be replaced: the latter, however, are in no way subject to wear and tear and need practically never be replaced, which in turn means that in the case mentioned the cost of the cartridge to be replaced is unnecessarily increased. Another consequence is that the articulated joints have to be suitably orientated within the body of the cock and thus the cartridge retaining cap must also be orientated, and cannot be simply screwed up.

The purpose of the present invention is to obviate, wholly or in part, the inconveniences of the known forms of embodiment by rationalizing the construction of the cartridge in such a way that, on the one hand, its cost can be considerably lowered and, on the other hand, it is no longer necessary to orientate the retaining cap—which can be simply screwed on.

According to the invention, this purpose is achieved as a result of the fact that in a cock of the type mentioned the replaceable cartridge comprises a shell with means for holding the cartridge, which shell is orientated within the body of the cock and contains the plates in hard material, the related seal, control guide and movement-limiting means, said control means being provided with a coupling means adapted to transmit both translation movements and rotation movements, and the articulated joints for the control lever are connected to a cap for retaining the cartridge within the body of the cock, said articulated joints being provided with a coupling means adapted to transmit both translation movements and rotation movements, the coupling means for the plate control means and for the lever articulated joints being complementary and reciprocably engageable.

As a result of this characteristic, when the cap of the cock body is removed, the articulated joints and the control lever remain applied thereto and are not replaced together with the cartridge, which consists solely of components effectively liable to wear and defects; costs for cartridge replacement are thus reduced to a minimum. Moreover, the cap no longer takes part in the orientation of the working parts of the cock, and can therefore be a simple screw cap.

Another problem posed by single-control mixers with plates made of hard material concerns pre-closing. It has been found that if the flow is throttled before its interception by the plates, the noise-level of the cock can be considerably reduced and its efficiency in maintaining the pre-set mixing ratio when the flow-rate is altered can also be improved. The said preclosure has to date been effected by means of parts made of plastics material, in side-by-side arrangement and also cooperating, some movable with the control head of a movable plate, and the others static. This arrangement, however, causes the serious inconvenience that the pressure, which can reach fairly high levels, that comes to bear on the parts effecting the pre-closure tends to deform these and soon makes them unserviceable unless they are reinforced in a manner which is not compatible with advantageous industrial manufacture.

Thus, another purpose of the invention is to embody a single-control mixing cock with plates in hard material in which the pre-closure for the purpose indicated is performed by parts that cannot be deformed or damaged by the water pressure.

According to the invention, this purpose is achieved by virtue of the fact that the moving plate of the cock is solid with a control head provided with an upper outlet and resting against a shoulder and guide ring one edge of which, preferably rounded, cooperates with an edge of the control head to cause the desired pre-closure following the movement of the control head in the direction leading to the interception of flow by the plates, but prior to said interception.

With an arrangement of this kind, the water pressure tends to keep the parts causing the pre-closure close together instead of distancing them as is the case in the known arrangements; and consequently the said parts suffer no adverse effects from the setting up of said pressure during the pre-closure period.

The aforementioned pre-closure arrangement can in general be effected in any type of cock employing plates, whether it is of cartridge type or not. The arrangement, however, lends itself in particular to being usefully combined with the first indicated arrangement, embodying a cartridge-type cock with an efficient pre-closure line-up.

Figure 5:
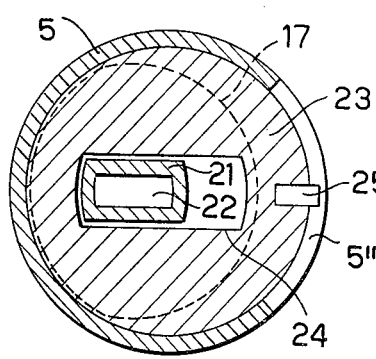
Figure 6:
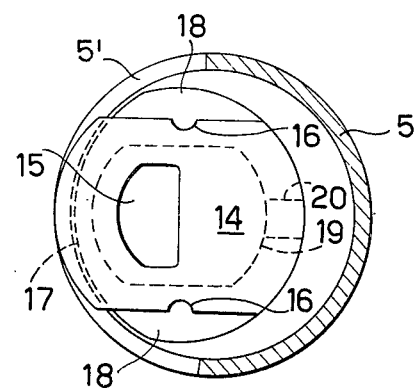
Figure 2:
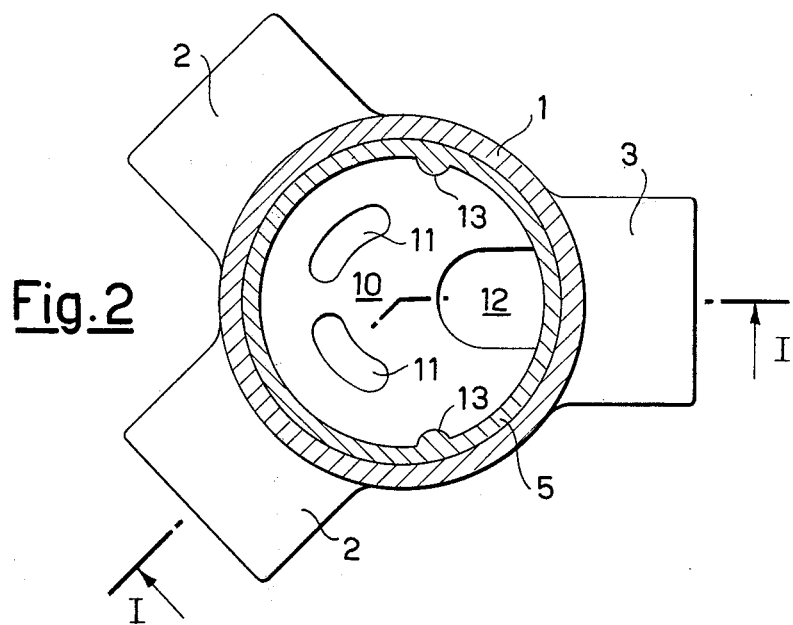
Figure 3:
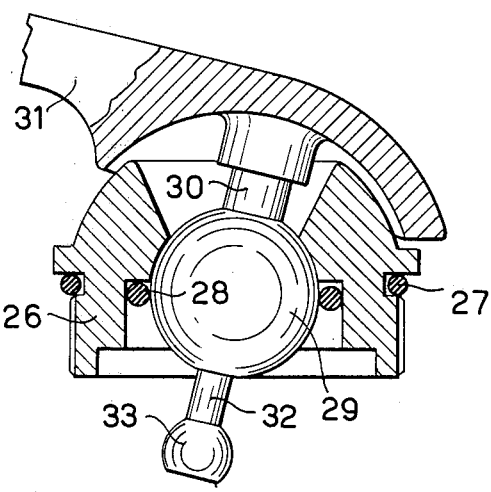
Figure 4:
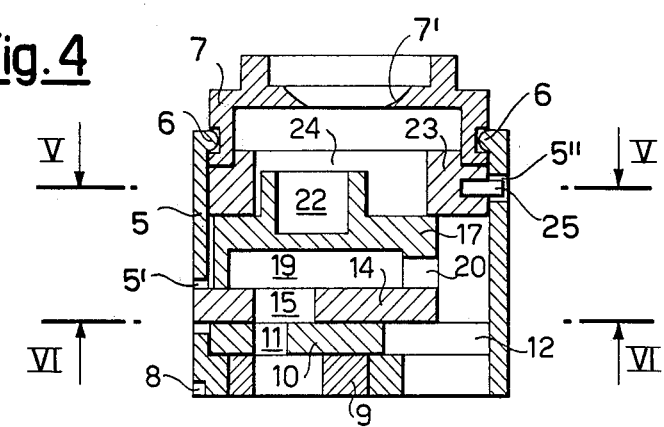
Figure 7:
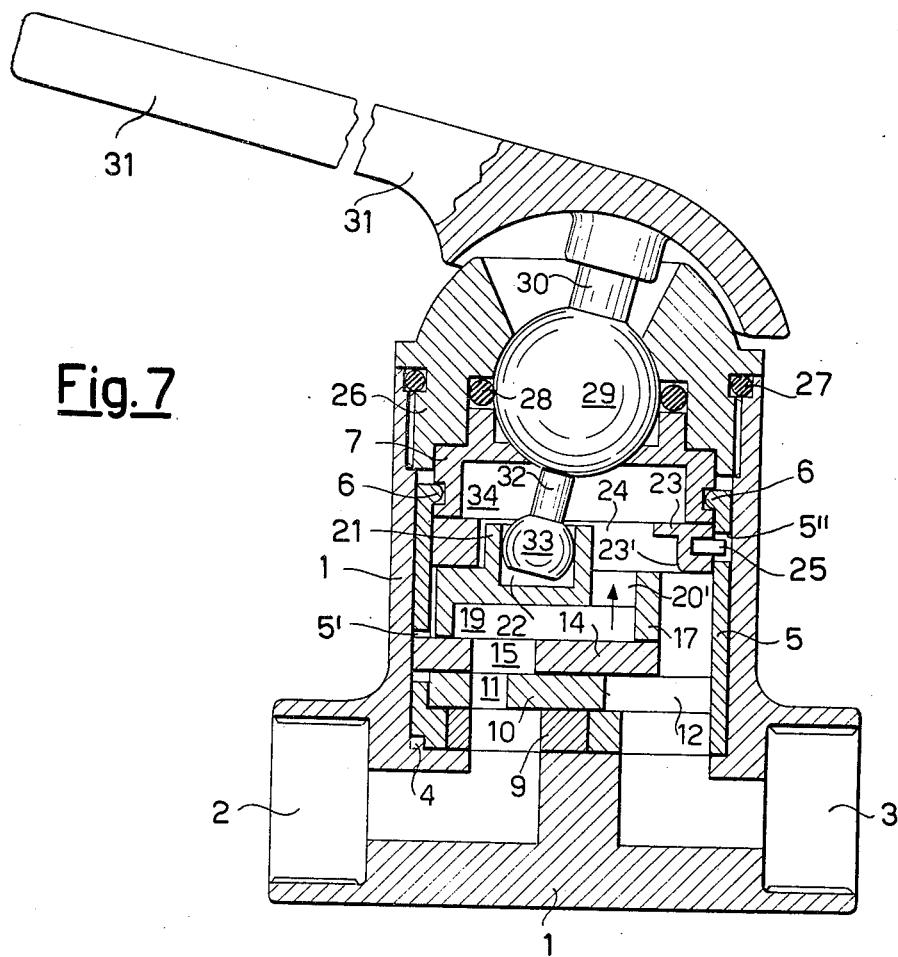
Figure 9:
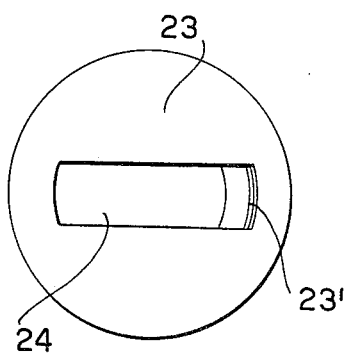
Figure 10:
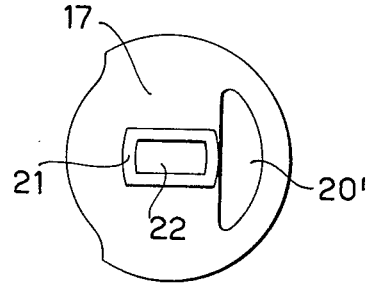
Figure 8:
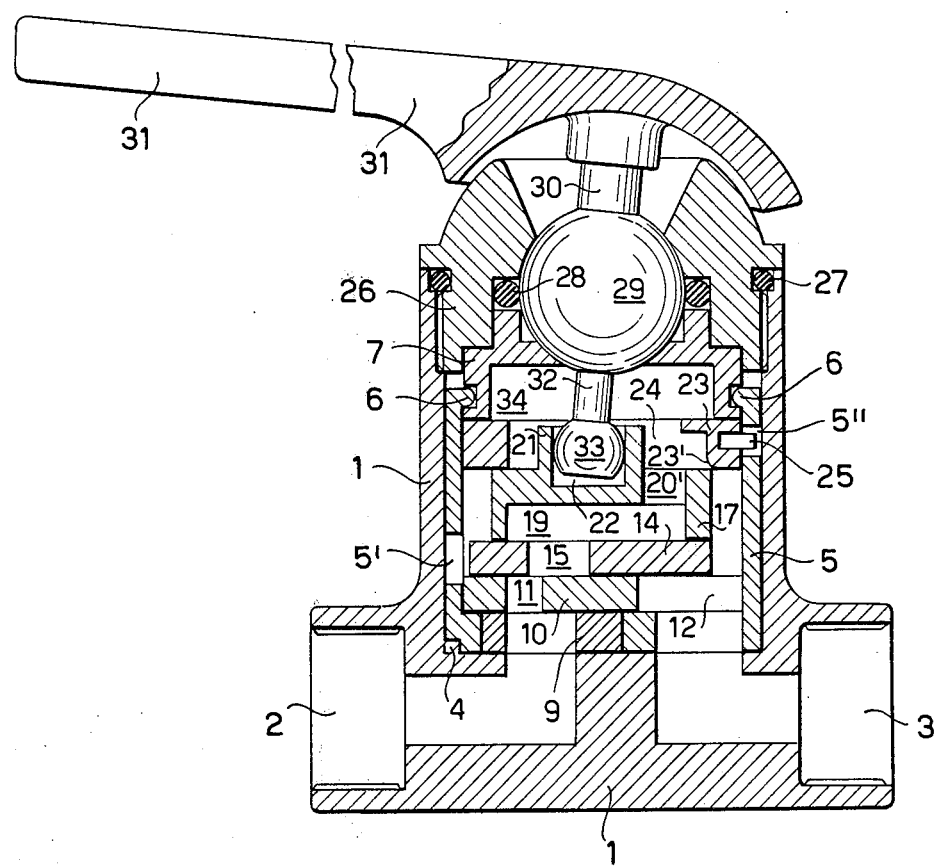

Further characteristics of the invention intended to reduce the dimensions of the cartridge, to assure it a dependable functioning and to protect the seal gasket of the lever articulated joints, so facilitating replacement, will appear from the following description of two forms of embodiment, given by way of example and in no way limiting, which are schematically represented in the attached drawings, in which:

FIG. 1 illustrates a section, in blown-up scale, of a cartridge type cock according to the invention, substantially along the dashed line I—I of FIG. 2, FIG. 2 is a section substantially in the direction of the line II—II of FIG. 1, FIGS. 3 and 4 illustrate, in the same representation as in FIG. 1, the cap of the cock with the control lever articulated joints, and also the cartridge, detached from the body of the cock, FIGS. 5 and 6 show sections of the cartridge, substantially in the direction of lines V—V and VI—VI of FIG. 4, FIG. 7 illustrates, similarly to FIG. 1, a cock provided with a pre-closure arrangement, in free flow position, FIG. 8 is a representation similar to that of FIG. 7, but with the cock in conditions of flow still to a great extent admitted by the plates of hard material but already markedly throttled by the pre-closure arrangement, FIG. 9 illustrates the shoulder and guide ring seen from the control head side, FIG. 10 is a top plan view of the control head or plate and its associated flow port.

With reference to the form of embodiment shown in FIGURES from 1 to 6, the cock represented comprises a body 1 provided with two fittings 2, 2 for the arrival of hot and cold water and with a fitting 3 for delivery of mixed water. The body 1 forms a cavity adapted to contain a cartridge and features an orientation means, such as a tooth 4, a recess or other kind of means, for the orientation of the cartridge contained.

The cartridge (illustrated independently in FIG. 4) comprises a shell 5–7, consisting of a principal portion 5 and a closure portion 7 which is retained by elastic snap-fit talons 6 on the portion 5. The shell portion 5 has an orientation means 8, in this case a recess, adapted to cooperate with the orientation means 4 of the body 1 in order to provide a correct orientation of the cartridge when it is inserted into the body of the cock. The shell portion also carries gasket means 9 which provide a seal between the fixed plate of the cock, as described hereinafter, and the arrival fittings 2, 2 of the body 1.

The static or fixed plate 10, represented in detail in FIG. 2, is positioned on the base of the shell 5 and has two windows 11, 11 which communicate with the fittings 2,2, and an aperture 12 which communicates with the delivery fitting 3, and also recesses cooperating with corresponding raised portions of the shell 5 in order to give a correct orientation to the plate 10. This plate is so disposed as not to have any movement within the cartridge.

On the fixed plate 10 there is positioned, in sliding fashion in contact with a smooth, honed surface, a moving plate 14, which can be clearly seen in FIG. 6. This is provided with a suitably shaped aperture 15 which, by cooperating in various positions with the apertures 11 of the plate 10 makes it possible to regulate both the delivery flow rate and the mixing proportions between hot water and cold water. Additionally, the moving plate 14 features recesses 16 for the control of its movements, which include rotatability and diametral translatability. To permit a maximum diametral translation distance with minimum cartridge diameter, the shell portion 5 has a slot 5' which the moving plate 14 can partly penetrate when in its most eccentric position.

The moving plate 14 has applied to it a control head 17 with ribbed fins 18 in order to make it solid with the moving plate 14 with the aid of the recesses 16. The control head 17 defines a chamber 19 into which the window 15 of the plate 14 opens; in its turn the plate 14 opens, through a window 20, towards the delivery passage or aperture mixed 12 and the water fitting 3. The dimensions of the control head 17 are smaller than those of the plate 14 towards the slot 5' of the shell, so as not to adversely affect the possibility of diametral movement of the moving plate 14. Moreover, the control head 17 has a substantially rectangular raised portion 21 which contains a cavity 22, also substantially rectangular, which constitutes a coupling means, as will be seen hereinafter.

The raised portion 21 of the head 17 is guided in a diametral rectangular window 24 of a rotatable ring 23 which is rotatably fitted in the shell portion 5 and is retained by the shell 6 of the cartridge. The ring 23 carries a radial pin 25 which moves within a slot 5" of the shell portion 5; this pin limits the possibility of rotation of the ring 23 in the cartridge. As a result of these arrangements, the head 17 and the moving plate 14 which is solid with it can rotate in the cartridge through a suitably limited angle, and can move in translation, for a limited section, only in a diametral direction. Thus the moving plate 14 finds inside the cartridge its necessary guide and motion-limiting means.

The body 1 of the cock is closed by a screw cap 26 with seal gasketing 27, which cap secures the cartridge in a position in which it rests on the portion 7 of its shell. During operation, the water pressure, which thrusts the fixed plate 10 upwards (as shown in FIG. 1) is transmitted by contact to the moving plate 14, to the control head 17, to the ring 23, to the portion 6 of the shell and to the cap 26, being released finally on the body 1 of the cock.

The cap 26 contains, freely movable, a ball 29 which is the articulated joint for the control lever, from the ball 29 extends a tang 30 which is coupled to the control lever 31. Additionally, a tang 32 terminating in a flat-disk shaped part 33 constituting a coupling member also extends from the ball 29. The disk 33 will insert itself into the rectangular section cavity 22 of the control head 17. As will be understood, this coupling is able to transmit to the control head 17 and thus to the moving plate 14 diametral translation movements when the lever 31 is caused to oscillate in the direction of the double arrow A, to regulate the delivery flow rate, and rotational movements when the lever 31 is caused to rotate about the axis of the tang 30 (i.e. with the lever being moved outside the plane of the drawing according to FIG. 1). This coupling, which is operative when the cock is assembled, is released by merely sliding out the disc 33 from the cavity 22 when the cap 26 is screwed off and the cartridge 5–6 is removed from the body 1 of the cock.

A gasket 28 is positioned between the ball 29 and the cap 26.

As FIG. 3 shows, the gasket 28 can be readily substituted after the cap 26 has been screwed off without any need even to remove the cartridge from the body of the cock: this fact is important inasmuch as the gasket 28 is the only one subject to wear in the entire cock. The said gasket 28, moreover, is protected from contact with calcareous particles or other impurities that may be entrained by the water because the ball 29 fits with only very slight clearance into a corresponding seating 7' in the part 5 of the cartridge body, and thus isolates the gasket 28 at least as regards solid particles.

It needs to be noted that, in the cartridge according to the invention, a particularly important part is played by the rotatable ring 23, the purpose of which is to guide diametrally the head 17 by means of the window 24, to limit its rotation by means of the pin 25 and to transmit the water pressure by constituting a shoulder.

With reference to the form of embodiment according to the FIGURES from 7 to 10, the cock represented consists for the most part of components identical to those of the cock according to the form of embodiment already described, and thus does not require a further full description. It should, however, be understood that the pre-closure arrangement described below is in no way limited in its application to a cartridge-type cock.

The control head 17 of the second form of embodiment different from the form of embodiment already described only inasmuch as the outlet aperture of the cavity 19 is not lateral as is the aperture 10 but consists of a window 20' in the top portion of the control head 17, i.e. facing towards the shoulder ring 23. Consequently the mixed water flows, through this window 20' and through the guide window 24 of the shoulder ring 23, to a chamber 34 formed within the shell portion 7 of the cartridge. The said chamber 34, which is of relatively large capacity, is in this case of very great utility for cushioning the flow coming from the cavity 19 of the control head 17.

The shoulder and guide ring 23, on the other hand, has a guide window 24 extending from the part facing the control head 17 up to an edge 23', preferably rounded. This edge 23' is so disposed as to be reached by the edge of the control head 17 during the latter's closure, before the cooperating apertures 11 and 15 of the plates of hard material 10 and 14 have performed any marked throttling of the flow. In this way, the action of throttling and thus of regulating the flow rate is mainly transferred to the cooperation between the control head 17 and the shoulder ring 23, which thus comes to have a further function. The closure between these two parts does not have to be water-tight, in that the complete interception of the flow is made, at the end of the stroke, by the plates 10, of hard material.

As the control head 17 is thrust towards the shoulder ring 23 by the pressure of the water, which is in any case released through said shoulder ring, the pre-closure arrangement is in no degree stressed by the flow throttling which it performs, and there is no need to fear any deformation of the parts such as will jeopardize their functioning.

Although the pre-closure arrangement described can be generally applied to cocks with or without cartridge, provided they have a control head for the moving plate and a rear-positioned member adapted to act as shoulder ring with a partial-closure edge cooperating with an edge of the control head, it should be noted that the said arrangement is very suitable for combination with the previously described cartridge characteristics. In particular, merely with substitution of the control head and shoulder ring, it is possible to effect standardized manufacture of cocks with pre-closure arrangement, particularly suitable for use on high-pressure water distribution networks, and also of cocks without pre-closure arrangement, especially suitable for use for very low-pressure networks.

It should be understood that some of the dispositions and conformations described can be modified in different ways, and that in general the components can be substituted with their technical equivalents, without thereby falling outside the scope of the present invention.

What is claimed is:

1. A single-control mixing cock for regulating the delivery flow rate and the proportional admixing of hot and cold water comprising a cock body including a wall defining a chamber, first and second port means for introducing hot and cold water respectively into said chamber and third port means for discharging water from said chamber, a unitized replaceable bodily insertable and removable cartridge housed within said chamber, valve means within said cartridge for regulating the delivery flow rate and the proportional admixing of hot and cold water between said first and second port means and said third port means, a cap, means for removably securing said cap to said cock body, a control member for manually operating said valve means, means for mounting said control member upon and for articulate motion relative to said cap, aperture means in said cartridge for gaining access to said valve means, means for coupling said control member to said valve means through said aperture means whereby movement of the control member moves said valve means, and said articulate mounting means being further effective for connecting said control member to said cap for the unitized removal of said cap, control member and at least a portion of said coupling means passing through said aperture means upon the operation of said removable securing means without destroying the unitized nature of said cartridge whereby upon the unitized bodily removal of said control member, said coupling means portion and said cap from said cock body said unitized cartridge and valve means therein can be likewise bodily withdrawn from said chamber.

2. The cock as defined in claim 1 including cooperative means between said cock body and said cartridge for accurately orienting said cartridge within said cock body during the assembly of the cartridge into said chamber, and said cooperative orienting means being an interengaging tooth and recess carried on by each of said cartridge and cock body.

3. The cock as defined in claim 1 wherein said cartridge is a shell made of two shell portions, means for coupling said two shell portions to each other, and gasket means between one of said shell portions and said cap for creating a fluid seal therebetween.

4. The cock as defined in claim 1 wherein said cartridge is a shell made of two shell portions, means for coupling said two shell portions to each other, and cooperative means between said cock body and one of said shell portions for accurately orienting said cartridge within said cock body during the assembly of the cartridge into said chamber.

5. The cock as defined in claim 1 wherein said cartridge is a shell made of two shell portions, means for coupling said two shell portions to each other, gasket means between one of said shell portions and said cap for creating a fluid seal therebetween and cooperative means between another of said shell portions and said cock body for accurately orienting said cartridge within said cock body during the assembly of the cartridge into said chamber.

6. The cock as defined in claim 1 wherein said cartridge is a shell made of two shell portions, means for coupling said two shell portions to each other, an annular ring in underlying abutting relationship to one of said shell portions, and said valve means being in underlying relationship to said annular ring whereby forces of water pressure acting upwardly against said valve means are transferred by said annular ring to said one shell portion.

7. The cock as defined in claim 1 wherein said cartridge is a shell made of two shell portions, means for coupling said two shell portions to each other, an annular ring in underlying abutting relationship to one of said shell portions, said valve means being in underlying relationship to said annular ring whereby forces of water pressure acting upwardly against said valve means are transferred by said annular ring to said one shell portion, and a radial pin carried by said annular ring which is received in a slot of said cartridge for limiting the movement of said annular ring within said cartridge.

8. The cock as defined in claim 1 wherein said cartridge is a shell made of two shell portions, means for coupling said two shell portions to each other, said valve means includes a fixed valve plate and a sliding valve plate with the latter being coupled to said control member through said coupling means, a slot in one of said shell portions, and said sliding valve plate being so aligned relative to said slot that a portion of said sliding valve plate can be received in said slot.

9. The cock as defined in claim 1 wherein said cartridge is a shell made of two shell portions, means for coupling said two shell portions to each other, said valve means includes a fixed valve plate and a sliding valve plate with the latter being coupled to said control member through said coupling means, an annular ring including an edge defining an opening, said sliding valve plate being disposed beneath said annular ring and being movable to open and close fluid flow through the opening thereof, and said annular ring edge being rounded.

10. The cock as defined in claim 1 wherein said cartridge is a shell made of two shell portions, means for coupling said two shell portions to each other, an uppermost of said two shell portions defining a chamber opening toward said valve means, and said valve means including a port opening in a direction toward said uppermost shell portion chamber whereby fluid is directed toward said last-mentioned chamber and is cushioned thereby.

11. The cock as defined in claim 1 wherein said cartridge is a shell made of two shell portions, means for coupling said two shell portions to each other, said articulate mounting means including a ball-like member, said cap and one of said shell portions having seats receiving thereagainst said ball-like member, and gasket means for preventing fluid flow between said cap and said ball-like member.

12. The cock as defined in claim 1 including cooperative means between said cock body and said cartridge for accurately orienting said cartridge within said cock body during the assembly of the cartridge into said chamber.

13. The cock as defined in claim 12 wherein said valve means include a fixed valve plate and a sliding valve plate with the latter being coupled to said control member through said coupling means, a plurality of port means in said valve means and said cartridge for conducting water selectively through said first, second and third port means, gasket means carried by said cartridge for sealing selected ones of said first, second, third and plurality of port means, guide means within said cartridge for guiding the motion of said control member; and said fixed and sliding valve plates, said plurality of ports, said gasket means and said guide means all being part of said unitized replaceable bodily insertable and removable cartridge.

14. The cock as defined in claim 12 wherein said cartridge is a shell made of two shell portions, means for coupling said two shell portions to each other, and gasket means between one of said shell portions and said cap for creating a fluid seal therebetween.

15. The cock as defined in claim 12 wherein said cartridge is a shell made of two shell portions, means for coupling said two shell portions to each other, an annular ring in underlying abutting relationship to one of said shell portions, and said valve means being in underlying relationship to said annular ring whereby forces of water pressure acting upwardly against said valve means are transferred by said annular ring to said one shell portion.

16. The cock as defined in claim 12 wherein said cartridge is a shell made of two shell portions, means for coupling said two shell portions to each other, an annular ring in underlying abutting relationship to one of said shell portions, said valve means being in underlying relationship to said annular ring whereby forces of water pressure acting upwardly against said valve means are transferred by said annular ring to said one shell portion, and a radial pin carried by said annular ring which is received in a slot of said cartridge for limiting the movement of said annular ring within said cartridge.

17. The cock as defined in claim 12 wherein said cartridge is a shell made of two shell portions, means for coupling said two shell portions to each other, said valve means includes a fixed valve plate and a sliding valve plate with the latter being coupled to said control member through said coupling means, a slot in one of said shell portions, and said sliding valve plate being so aligned relative to said slot that a portion of said sliding valve plate can be received in said slot.

18. The cock as defined in claim 12 wherein said cartridge is a shell made of two shell portions, means for coupling said two shell portions to each other, an uppermost of said two shell portions defining a chamber opening toward said valve means, and said valve means including a port opening in a direction toward said uppermost shell portion chamber whereby fluid is directed toward said last-mentioned chamber and is cushioned thereby.

19. The cock as defined in claim 12 wherein said cartridge is a shell made of two shell portions, means for coupling said two shell portions to each other, said articulate mounting means including a ball-like member, said cap and one of said shell portions having seats receiving thereagainst said ball-like member, and gasket means for preventing fluid flow between said cap and said ball-like member.

20. The cock as defined in claim 1 wherein said valve means include a fixed valve plate and a sliding valve plate with the latter being coupled to said control member through said coupling means, a plurality of port means in said valve means and said cartridge for conducting water selectively through said first, second and third port means, gasket means carried by said cartridge for sealing selected ones of said first, second, third and plurality of port means, guide means within said cartridge for guiding the motion of said control member; and said fixed and sliding valve plates, said plurality of ports, said gasket means and said guide means all being part of said unitized replaceable bodily insertable and removable cartridge.

21. The cock as defined in claim 20 wherein said cartridge is a shell made of two shell portions, means for coupling said two shell portions to each other, and gasket means between one of said shell portions and said cap for creating a fluid seal therebetween.

22. The cock as defined in claim 20 wherein said cartridge is a shell made of two shell portions, means for coupling said two shell portions to each other, an annular ring in underlying abutting relationship to one of said shell portions, and said valve means being in underlying relationship to said annular ring whereby forces of water pressure acting upwardly against said valve means are transferred by said annular ring to said one shell portion.

23. The cock as defined in claim 20 wherein said cartridge is a shell made of two shell portions, means for coupling said two shell portions to each other, an annular ring in underlying abutting relationship to one of said shell portions, said valve means being in underlying relationship to said annular ring whereby forces of water pressure acting upwardly against said valve means are transferred by said annular ring to said one shell portion, and a radial pin carried by said annular ring which is received in a slot of said cartridge for limiting the movement of said annular ring within said cartridge.

24. The cock as defined in claim 20 wherein said cartridge is a shell made of two shell portions, means for coupling said two shell portions to each other, said valve means includes a fixed valve plate and a sliding valve plate with the latter being coupled to said control member through said coupling means, a slot in one of said shell portions, and said sliding valve plate being so aligned relative to said slot that a portion of said sliding valve plate can be received in said slot.

25. The cock as defined in claim 20 wherein said cartridge is a shell made of two shell portions, means for coupling said two shell portions to each other, an uppermost of said two shell portions defining a chamber opening toward said valve means, and said valve means including a port opening in a direction toward said uppermost shell portion chamber whereby fluid is directed toward said last-mentioned chamber and is cushioned thereby.

26. The cock as defined in claim 20 wherein said cartridge is a shell made of two shell portions, means for coupling said two shell portions to each other, said articulate mounting means including a ball-like member, said cap and one of said shell portions having seats receiving thereagainst said ball-like member, and gasket means for preventing fluid flow between said cap and said ball-like member.

* * * * *